(12) United States Patent
Fortin et al.

(10) Patent No.: US 9,776,571 B2
(45) Date of Patent: Oct. 3, 2017

(54) VEHICLE RETRACTABLE STEP ASSEMBLY

(71) Applicant: Nissan North America, Inc., Franklin, TN (US)

(72) Inventors: Hugo Fortin, Lerma (MX); Asaad Agis, Metepec (MX); Ruben Rodriguez, Metepec (MX)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/974,580

(22) Filed: Dec. 18, 2015

(65) Prior Publication Data

US 2017/0174138 A1 Jun. 22, 2017

(51) Int. Cl.
*B60R 3/02* (2006.01)

(52) U.S. Cl.
CPC ..................... *B60R 3/02* (2013.01)

(58) Field of Classification Search
CPC B60R 3/00; B60R 3/002; B60R 3/007; B60R 3/02; B61D 23/02; B61D 23/025
See application file for complete search history.

(56) References Cited

U.S. PATENT DOCUMENTS

| | | | |
|---|---|---|---|
| 2,702,195 A * | 2/1955 | Merrill .................. | B60R 3/02 182/89 |
| 3,961,809 A * | 6/1976 | Clugston .................. | B60R 3/02 105/447 |
| 7,448,637 B2 * | 11/2008 | Parker .................. | E06C 1/005 182/88 |
| 7,490,889 B1 * | 2/2009 | Scoggins .................. | B60R 3/007 280/166 |
| 2003/0070875 A1 * | 4/2003 | Medsker .................. | B60R 3/02 182/91 |
| 2006/0170179 A1 * | 8/2006 | Dahl .................. | B60R 3/02 280/163 |
| 2006/0255558 A1 * | 11/2006 | Okuyama .................. | B60R 3/02 280/166 |
| 2013/0048400 A1 * | 2/2013 | Holdener .................. | B60R 3/02 180/89.1 |

* cited by examiner

*Primary Examiner* — Frank Vanaman
(74) *Attorney, Agent, or Firm* — Global IP Counselors, LLP

(57) ABSTRACT

A vehicle retractable step assembly includes a support member, a support arm, a step member and a restricting assembly. The support member is configured to attach to a vehicle body structure. The support arm has a first end and a second end. The first end is supported to the support member for pivoting movement with respect to the support member. The step member is attached to the second end of the support arm for pivotal movement relative to the second end of the support arm between a retracted orientation where the step member is located adjacent to the support member and an extended orientation where the step member is spaced apart from the support member. The restricting assembly is releasably attached to the support member and positioned to prevent pivoting movement of the support arm relative to the support member.

13 Claims, 7 Drawing Sheets

VEHICLE RETRACTABLE STEP ASSEMBLY

BACKGROUND

Field of the Invention

The present invention generally relates to a vehicle retractable step assembly. More specifically, the present invention relates to vehicle retractable step assembly that is movable between a retracted orientation and an extended orientation but is modified to prevent or limit movement.

Background Information

Commercial passenger vehicles, such a van or taxi, often include a retractable step assembly beneath a passenger compartment door opening. The retractable step assembly includes a mechanism and structure that enables movement of the step from a retracted orientation beneath the vehicle, to an extended orientation where the step extends laterally outward from the vehicle providing a foot receiving surface that assists a passenger entering and leaving the passenger compartment.

SUMMARY

One object of the present disclosure is to provide a vehicle retractable step assembly with a temporary or permanent structure that is easily installed in order to limit movement or prevent all movement of the retractable step assembly.

In view of the state of the known technology, one aspect of the present disclosure is to provide a vehicle retractable step assembly with a support member, a support arm, a step member and a restricting assembly. The support member is configured to attach to a vehicle body structure. The support arm has a first end and a second end, the first end being supported to the support member for pivoting movement with respect to the support member. The step member is attached to the second end of the support arm for pivotal movement relative to the second end of the support arm between a retracted orientation where the step member is located adjacent to the support member and an extended orientation where the step member is spaced apart from the support member. The restricting assembly is releasably attached to the support member and positioned to prevent pivoting movement of the support arm relative to the support member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
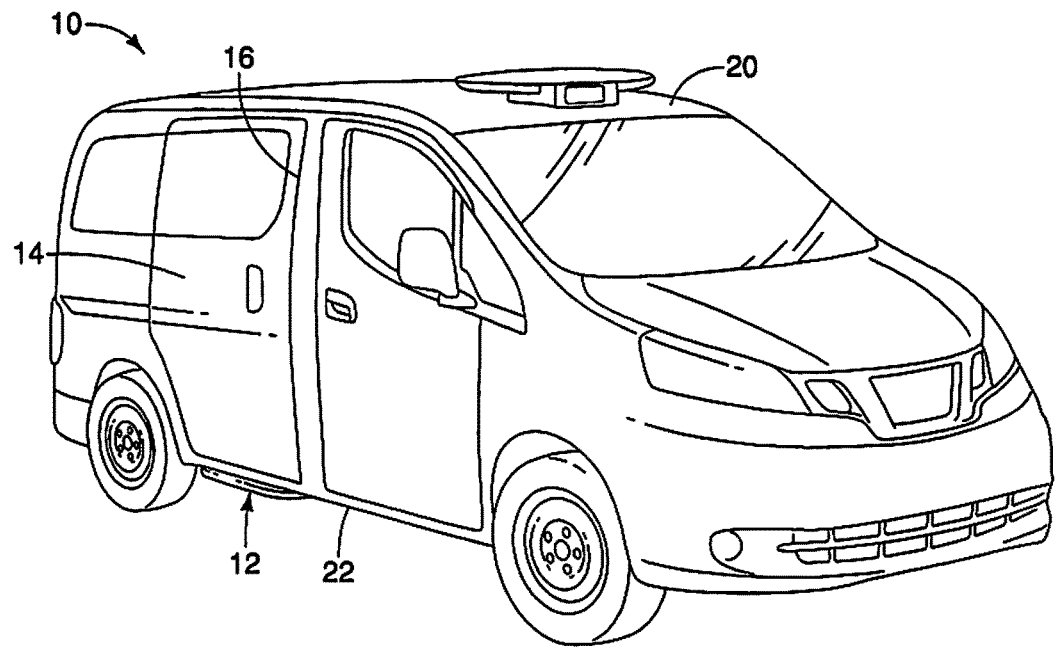
FIG. 1 is a perspective view of a vehicle that includes a retractable step assembly located beneath a door and door opening, shown with the door in a closed position and the retractable step assembly in a retracted orientation in accordance with a first embodiment.
Figure 2:
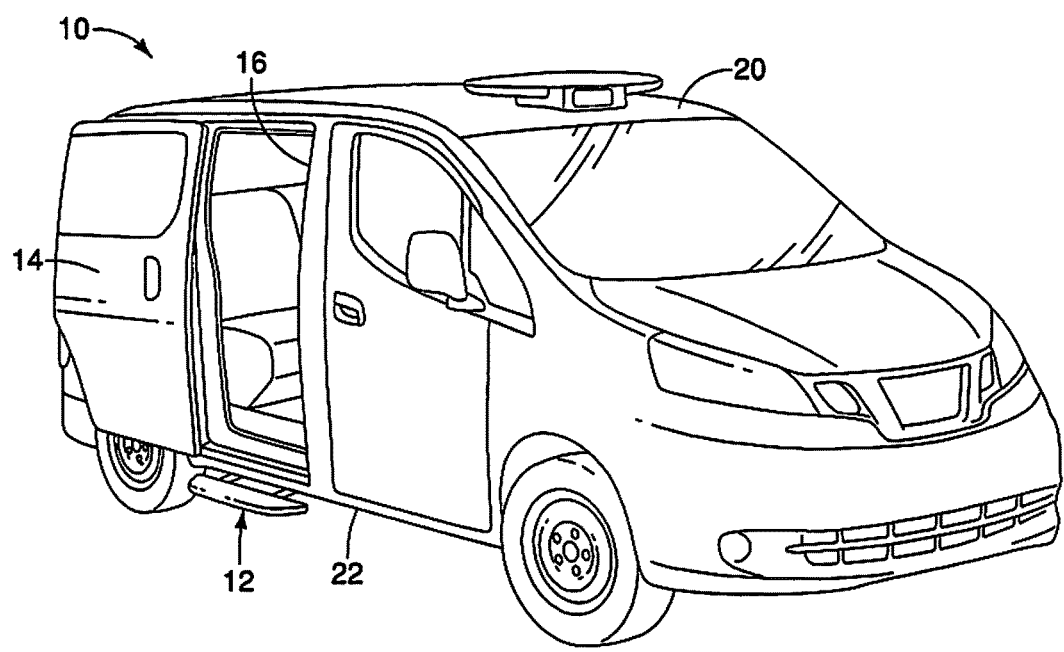
FIG. 2 is another perspective view of the vehicle showing the door in an open position and the retractable step assembly in an extended orientation in accordance with the first embodiment.

Referring initially to FIG. 1, a vehicle 10 having a retractable step assembly 12 is illustrated in accordance with a first embodiment. FIG. 1 is view of the vehicle 10 showing a door 14 in a closed position covering a door opening 16. The retractable step assembly 12 is located beneath the door opening 16 in a retracted orientation. In FIG. 2 the door 14 in an open position exposing the door opening 16 with the retractable step assembly 12 in an extended orientation beneath the door opening 16.

In the depicted embodiment, the vehicle 10 is a commercial vehicle, such as a taxi or passenger shuttle vehicle. However, it should be understood from the drawings and the description herein that the vehicle 10 can be any of a variety of vehicle structures and that use of the retractable step assembly 12 is not limited to use in depicted vehicle, but can be used in any of a variety of vehicles.

As shown in FIGS. 1 and 2, the vehicle 10 includes a vehicle body structure 20 that defines at least one door opening 16 and an underside structure 22 beneath the door opening 16. In the depicted embodiment, the door 14 is a sliding door that moves between the closed position and the open position along a track structure build into the vehicle body structure 20. However, it should be understood from the drawings and the description herein that the door 12 can also be a conventional hinge supported door that moves between an open position and a closed position by pivoting on hinges fixed to the door and the vehicle body structure. Since vehicle body structures, door hinge structures and track structures for sliding doors are conventional vehicle structures, further description is omitted for the sake of brevity.

Figure 5:
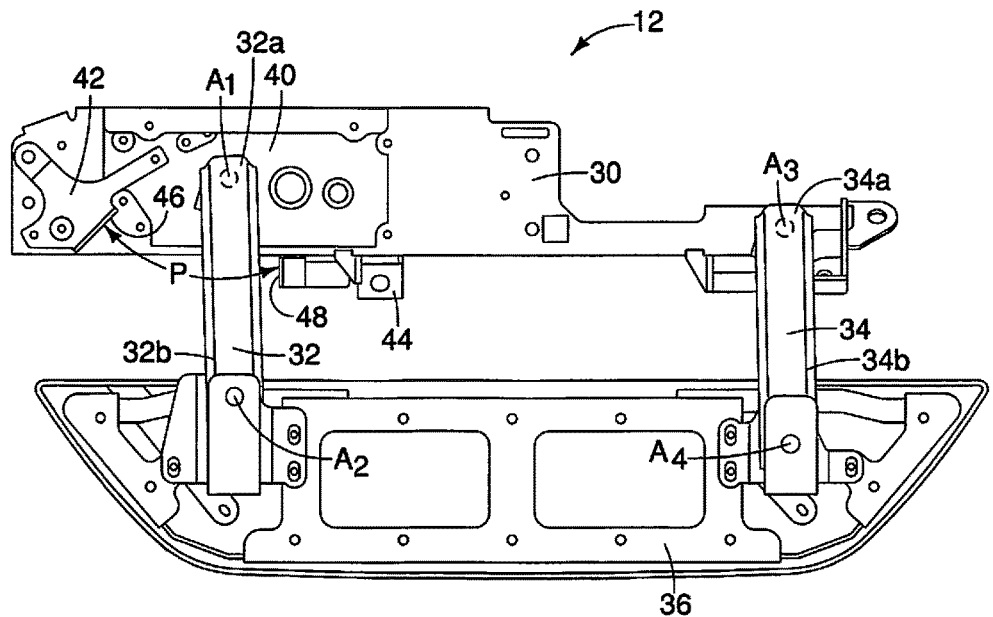
FIG. 5 is a bottom view of the retractable step assembly removed from the vehicle showing underside surfaces of the support member, the first and second support arms and the step member, with the step member in the extended orientation in accordance with the first embodiment.
Figure 6:
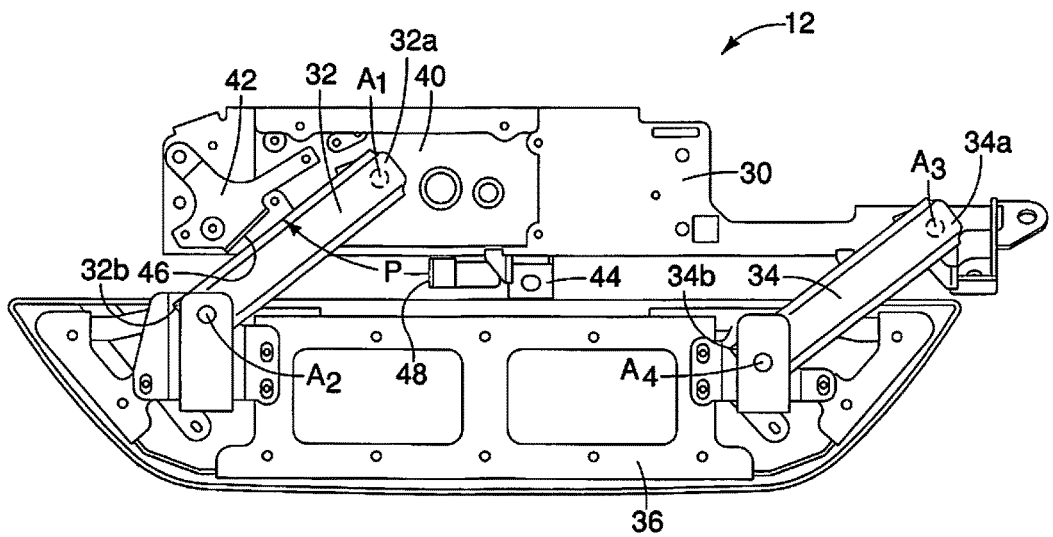
FIG. 6 is another bottom view of the retractable step assembly showing the step member moved toward the extended orientation in a first intermediate position in accordance with the first embodiment.
Figure 7:
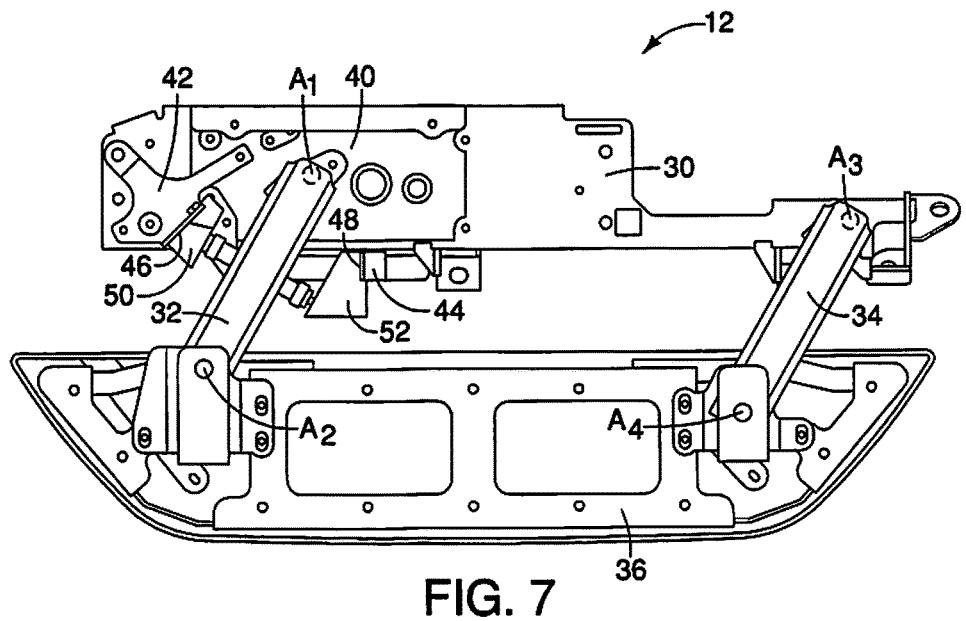
FIG. 7 is yet another bottom view of the retractable step assembly with a restricting assembly installed to the support member restricting movement of the first support arm such that the step member remains in a second intermediate position in accordance with the first embodiment.
Figure 8:
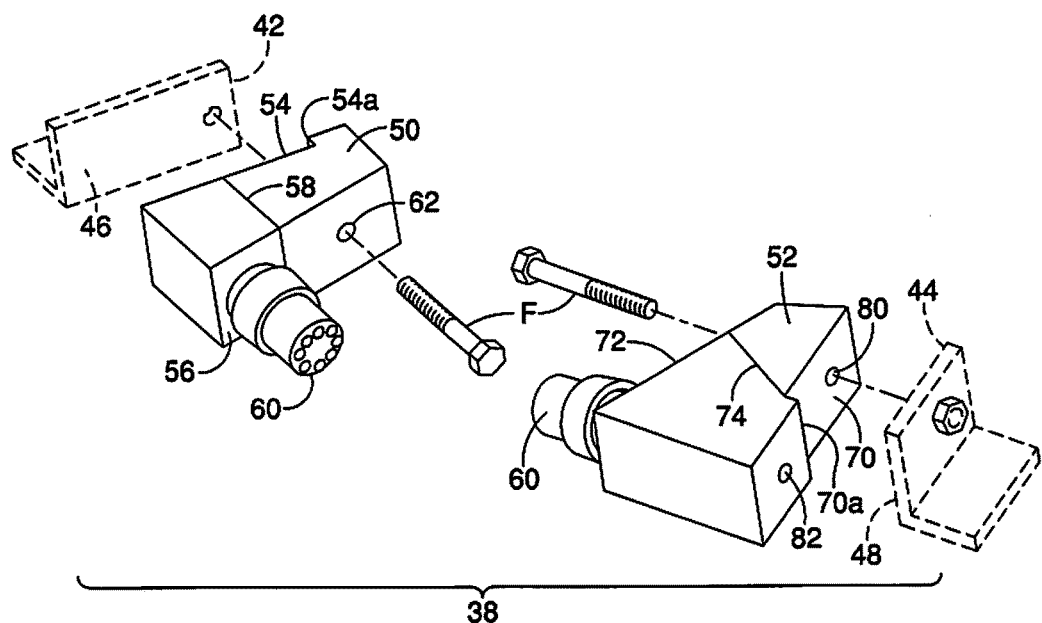
FIG. 8 is a perspective view of the restricting assembly shown removed from the retractable step assembly showing a first block and a second block, each of the first and second blocks having a vibration dampening member attached thereto in accordance with the first embodiment.

A description the retractable step assembly 12 is now provided with specific reference to FIGS. 3-7. The retractable step assembly 12 basically includes a support member 30, a first support arm 32, a second support arm 34, a step member 36 and a restricting assembly 38 (FIGS. 7 and 8).

The support member 30 is a flat metal panel that includes a step controlling mechanism 40, a first stop bracket 42 and a second stop bracket 44. The support member 30 is configured to attach to the underside structure 22 of the vehicle body structure 20 in a conventional manner, such as via mechanical fasteners (not shown). Since attachment of a structural member such as the support member 30 to the underside structure 22 of the vehicle body structure 20 is a conventional arrangement, further description is omitted for the sake of brevity.

The step controlling mechanism 40 can be any of a variety of mechanisms. For example, the step controlling mechanism 40 can be a mechanical device operated by a lever (not shown) such that a vehicle passenger or vehicle operator can move the step member 36 between the retracted orientation and the extended orientation. Alternatively, the step controlling mechanism 40 can be a mechanical device operated by a lever (not shown) slaved to movement of the door 14, such that movement of the door 14 from the closed position to the open position causes the step controlling mechanism 40 to move the step member 36 from the retracted orientation to the extended orientation, and movement of the door 14 from the open position to the closed position causes the step controlling mechanism 40 to move the step member 36 from the extended orientation to the retracted orientation. Since step controlling mechanisms are convention structures, further description is omitted for the sake of brevity.

The first stop bracket 42 is fixed to an underside of the support member 30 via, for example, mechanical fasteners or welding techniques. The second stop bracket 44 is also fixed to the underside of the support member 30 via, for example, mechanical fasteners or welding techniques, but is spaced apart from the first stop bracket 42. As is shown in FIGS. 5 and 6, the first support arm 32 pivots along an arcuate path P that is defined between the first stop bracket 42 and the second stop bracket 44. More specifically, the first stop bracket 42 has a first stop surface 46 that defines a first end of travel along the arcuate path P and the second stop bracket 44 includes a second stop surface 48 that defines the second end of travel along the arcuate path P. In other words, the first stop surface 46 and the second stop surface 48 are positioned to limit movement of the first support arm 32 such that with the first support arm 32 located adjacent to the first stop surface 46 the step member 36 is in or close to the retracted orientation and with the first support arm 32 located adjacent to the second stop surface 48 the step member 36 is in or close to the extended orientation. In the depicted embodiment, the first stop surface 46 and the second stop surface 48 limit the arcuate path P to about 50 degrees of overall pivoting movement. Although not shown, the first stop surface 46 and the second stop surface 48 can include a rubber or elastic coating to cushion the movement of the first support arm 32 in the event that it contacts the first stop bracket 42 and the second stop bracket 44. Under normal operation of the retractable step assembly 12, the first and second support arms 34 can pivot within the arcuate path P. The arcuate path P can further be any value between about 40 and 80 degrees as measured between the retracted orientation and the extended orientation of the step member 36, in the absence of the restricting assembly 38.

As is described below in the various embodiments, the first stop bracket 42 and the second stop bracket 44 are modified by inclusion of the restricting assembly 38 such that the arcuate path P can be altered or eliminated completely, thereby further limiting movement of step member 36 reducing the size of the arcuate path P or completely preventing movement of step member 36, as is described in greater detail below.

As shown in FIGS. 5 and 6, the first support arm 32 has a first end 32a and a second end 32b. The first end 32a is supported to the support member 30 for pivoting movement with respect to the support member 30 about a pivot pin that defines first pivot axis $A_1$. The second end 32b is supported to the step member 36 for pivoting movement with respect to the step member 36 about a pivot pin that defines second pivot axis $A_2$.

Similarly, the second support arm 34 has a first end 34a and a second end 34b. The first end 34a is supported to the support member 30 for pivoting movement with respect to the support member 30 about a pivot pin that defines third pivot axis $A_3$. The second end 34b is supported to the step member 36 for pivoting movement with respect to the step member 36 about a pivot pin that defines fourth pivot axis $A_4$.

Figure 3:
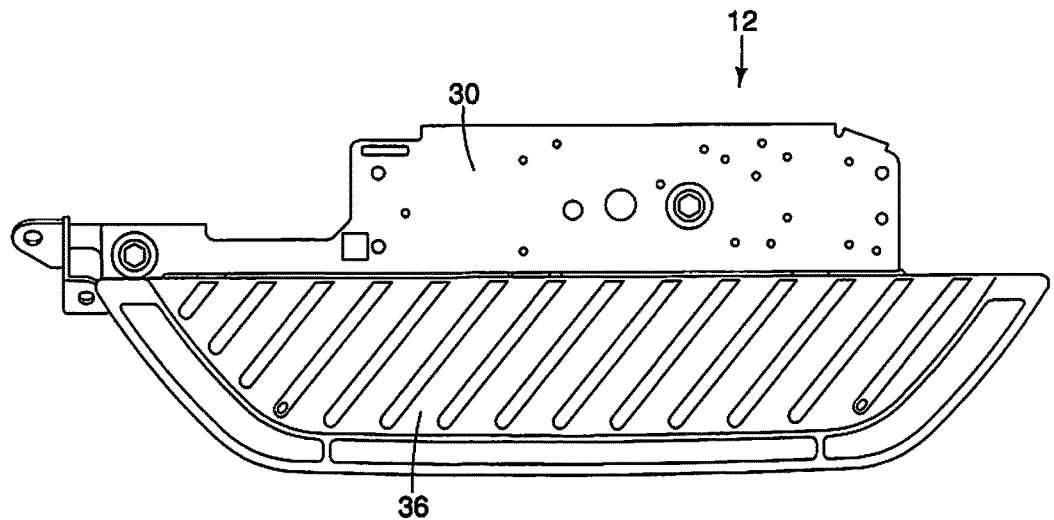
FIG. 3 is a top view of the retractable step assembly removed from the vehicle showing a support member and a step member, with the step member in the retracted orientation in accordance with the first embodiment.
Figure 4:
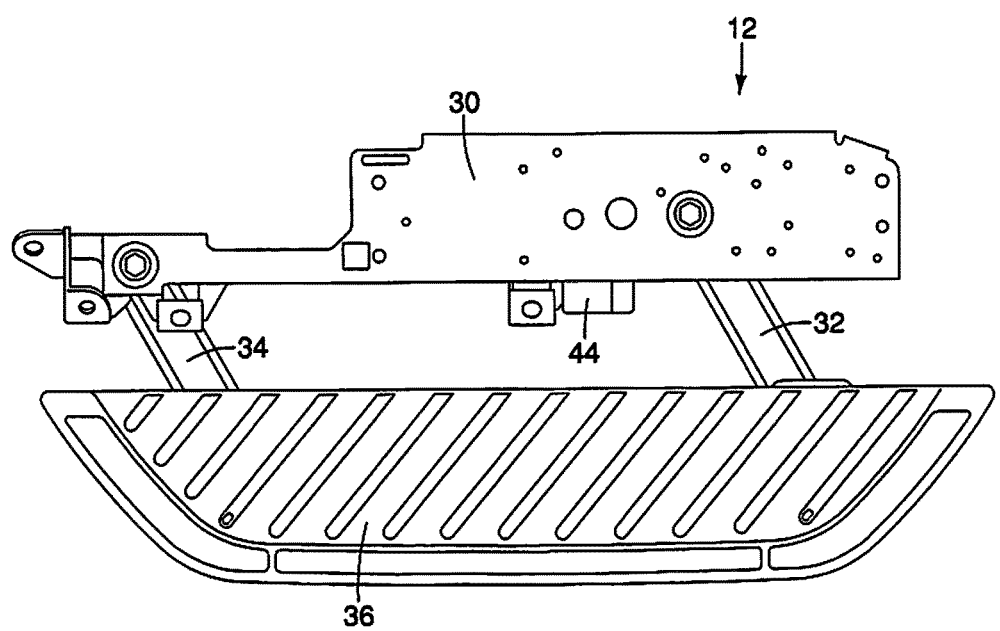
FIG. 4 is another top view of the retractable step assembly similar to FIG. 3 showing first and second support arms that support the step member to the support member, shown with the step member in the extended orientation in accordance with the first embodiment.

The step member 36 a flat, elongated member that has a generally flat upper surface (with traction ridges), as shown in FIGS. 3 and 4. The step member 36 is attached to the second end 32a of the first support arm 32 and the second end 34a of the second support arm 34 for pivotal movement about the second and fourth pivot axis $A_2$ and $A_4$. Consequently, the step member 36 is supported by the support member 30 for movement between the retracted orientation where the step member 36 is located adjacent to the support member 30 and the extended orientation where the step member 36 is spaced apart from the support member 30.

As is shown in FIGS. 5 and 6, the first, second, third and fourth pivot axis $A_1$, $A_2$, $A_3$ and $A_4$, define a parallelogram-like linkage such that the step member 36 remains parallel to the support member 30, regardless of the movement of the step member 36 relative to the support member 30.

A description of the restricting assembly 38 in accordance with the first embodiment is now provided with specific reference to FIGS. 7-11.

The restricting assembly 38 is an add-on feature to the retractable step assembly 12. Specifically, the retractable step assembly 12 can be operated without the restricting assembly 38 but is provided with more diverse functionality with the inclusion of the restricting assembly 38, as is described in greater detail below.

The restricting assembly 38 is configured to be releasably attached to the support member 30 and positioned to further limit (reduce the size of the arcuate path P) or completely prevent pivoting movement of the first support arm 32 relative to the support member. In the first embodiment, the restricting assembly 38 includes a first block 50 and a second block 52 which are removably installed to the first stop bracket 42 and the second stop bracket 44, respectively, via fasteners F, as shown in FIG. 8. More specifically, the first block 50 removably attached via the fastener F to the first stop bracket 42 and the second block 52 removably attached via another fastener F to the second stop bracket 44.

Figure 9:
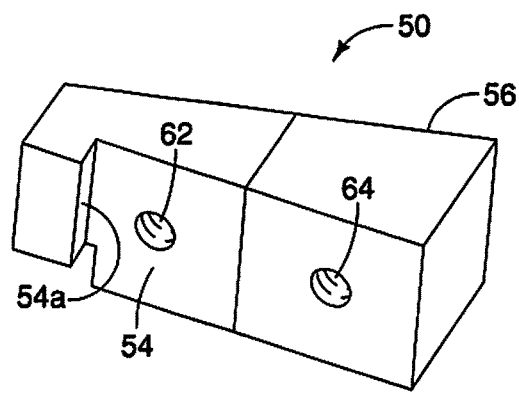
FIG. 9 is a perspective view of the first block with the vibration dampening member removed in accordance with the first embodiment.

As shown in FIGS. 8 and 9 the first block 50 includes a first surface 54, a second surface 56, a frangible portion 58 and a vibration dampening member 60. The first surface 54 is dimensioned to contact the first stop surface 46 of the first stop bracket 42 and includes a shoulder portion 54a. The shoulder portion 54a is located in such a way as to properly locate the first block 50 on the first stop bracket 42. The second surface 56 includes a first aperture 62 and a second aperture 64 that both extend to the first surface 54. The first aperture 62 receives the fastener F which then threads into a threaded aperture in the first stop surface 46 of the first stop bracket 42. The shoulder portion 54a is spaced apart from the first aperture 62 facilitating alignment between the first aperture 62 and the aperture in the first stop surface 46. The second aperture 64 receives the vibration dampening member 60 such that the vibration dampening member 60 is fully supported by the first block 50. The first surface 54 is located on an opposite side of the first block 50 from the second surface 56. As shown in FIGS. 8 and 9, the first surface 54 is not parallel to the second surface 56. Rather, the first surface 54 is angularly offset from the second surface 56 by an angle that can be anywhere between 15 degrees and 50 degrees. However, in the depicted embodiment, the first surface 54 is angularly offset from the second surface 56 by an angle of approximately 20 degrees.

The first block 50 is made of a rigid material, such a metallic material, that includes the frangible portion 58. In response to an impact having a predetermined level of force, the first block 50 can break or fracture along the frangible portion 58 into at least two separate pieces. The frangible portion 58 can be any of a variety of structural features on the first block 50. For example, the frangible portion 58 can be an indentation or deep score line that promotes breakage of the first block 50 during an impact event. The frangible portion 58 does not weaken the first block 50 with respect to restricting movement of the first support arm 32, but rather provides a convenient location for breakage in the event of impact of sufficient force which can cause the first block 50 to fracture, thereby releasing the first support arm 32 allowing it to freely pivot.

Figure 11:
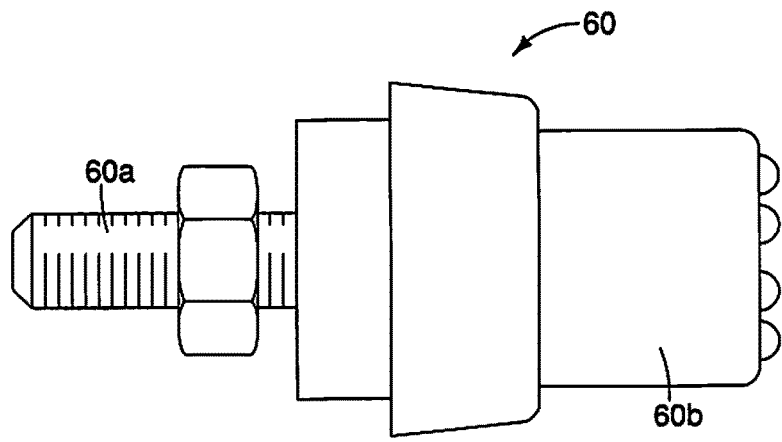
FIG. 11 is a side view of the vibration dampening member in accordance with the first embodiment.

As shown in FIG. 11, the vibration dampening member 60 includes a threaded portion 60a and an elastic cushioning portion 60a that is made of a resilient and compressible material. The treaded portion 60a is threaded into the second aperture 64 such that with the first block 50 installed to the first stop bracket 44, the elastic cushioning portion 60a presses against the first support arm 32 and limits and/or prevents movement of the first support arm 32.

Figure 10:
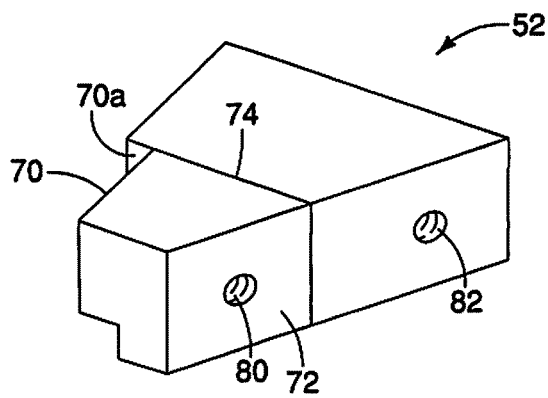
FIG. 10 is a perspective view of the second block with the vibration dampening member removed in accordance with the first embodiment.

As shown in FIGS. 8 and 10 the second block 52 includes a first surface 70, a second surface 72, a frangible portion 74 and another vibration dampening member 60. The first surface 70 is dimensioned to contact the second stop surface 48. The first surface 70 is dimensioned to contact the second stop surface 48 of the first stop bracket 44 and includes a shoulder portion 70a. The shoulder portion 70a is located in such a way as to properly locate the second block 52 on the second stop bracket 44.

The second surface 72 includes a first aperture 80 and a second aperture 82 that both extend to the first surface 70. The first aperture 80 receives the fastener F which then threads into a threaded aperture in the second stop surface 48 of the second stop bracket 44. The shoulder portion 70a is spaced apart from the first aperture 80 facilitating alignment between the first aperture 80 and the aperture in the second stop surface 48. The second aperture 82 receives the vibration dampening member 60 such that the vibration dampening member 60 is fully supported by the second block 52. The vibration dampening member 60 of the second block 52 is identical to the vibration dampening member 60 of the first block 50.

The first surface 70 is located on an opposite side of the second block 52 from the second surface 72. As shown in FIGS. 8 and 9, the first surface 70 is not parallel to the second surface 72. Rather, the first surface 70 is angularly offset from the second surface 72 by an angle that can be anywhere between 15 degrees and 50 degrees. However, in the depicted embodiment, the first surface 70 is angularly offset from the second surface 72 by an angle of approximately 30 degrees. As a result, with both the first block 50 and the second block 52 installed to the support member 30, the first support arm 32 is confined between the vibration dampening member 60 of the first block 50 and the vibration dampening member 60 of the second block 52, thereby preventing pivoting movement of the first support arm 32 and the step member 36.

The second block 52 is made of a rigid material, such a metallic material that includes the frangible portion 74. In response to an impact having a predetermined level of force, the second block 52 can break or fracture along the frangible portion 74 into at least two separate pieces. The frangible portion 74 can be any of a variety of structural features on the second block 52. For example, the frangible portion 74 can be an indentation or deep score line that promotes breakage of the second block 52 during an impact event. The frangible portion 74 does not weaken the second block 52 with respect to restricting movement of the first support arm 32, but rather provides a convenient location for breakage in the event of impact of sufficient force which can cause the second block 52 to fracture, thereby releasing the first support arm 32 allowing it to freely pivot.

The restricting assembly 38 is installed to the retractable step assembly 12 for any of a variety of reasons as an after-market features. One purpose of the restricting assembly 38 is to temporarily lock the retractable step assembly 12 into a fixed position. For example, in a commercial setting where the vehicle 10 is in constant use and the step controlling mechanism 40 malfunctions prevent proper movement of the retractable step assembly 12, there may be insufficient time to repair or replace the step controlling mechanism 40. In this case, the restricting assembly 38 provides a quick temporary repair that retains the retractable step assembly 12 in a predetermined fixed, non-movable orientation such that the vehicle 10 can be continue to be of use until such time as a replacement or repair of the step controlling mechanism 40 can be effected. Another purpose of the restricting assembly 38 is to simply circumvent the operation of the retractable step assembly 12 in order to prevent all movement thereof. For example, there are cases where the retractable step assembly 12 may not provide the desired convenience of the vehicle operator and/or vehicle passengers. Therefore, it may be desirable to lock the retractable step assembly 12 in a fully extended orientation, as in the second embodiment (FIG. 12), as described below. In yet another application of the restricting assembly 38, it may be desirable to lock the retractable step assembly 12 at or adjacent to the retracted orientation, as in the third embodiment (FIG. 13), as described below. In still another application of the restricting assembly 38, it may be desirable to merely reduce the angle of the arcuate path P of the retractable step assembly 12, as in the fourth embodiment (FIGS. 14-15), as described below.

Second Embodiment

Figure 12:
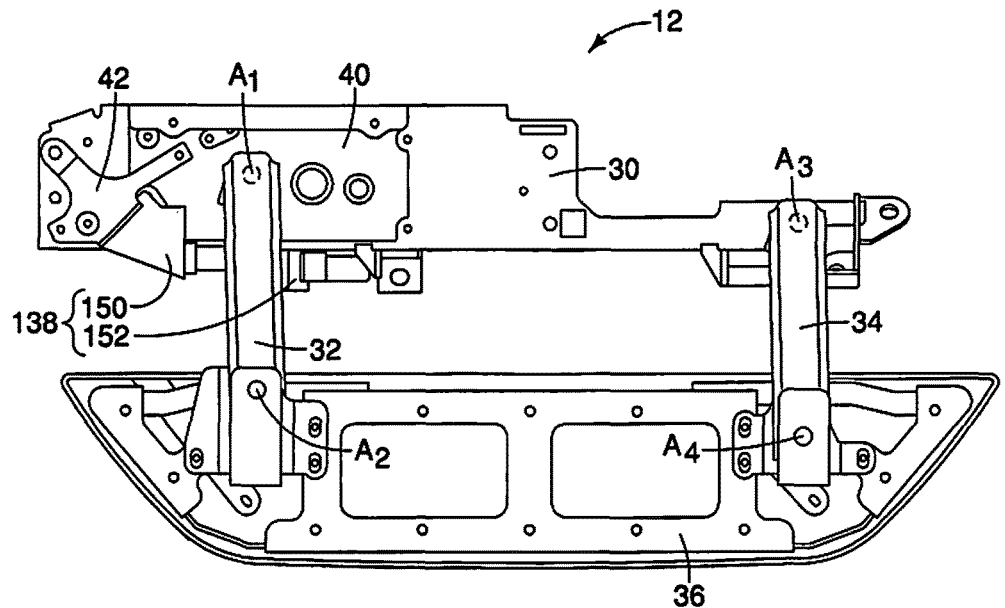
FIG. 12 is a bottom view of the retractable step assembly with a restricting assembly installed to the support member restricting movement of the first support arm such that the step member remains in or adjacent to the extended orientation in accordance with a second embodiment.

Referring now to FIG. 12, a restricting assembly 138 installed to the retractable step assembly 12 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The retractable step assembly 12 is identical to the retractable step assembly 12 as described above in the first embodiment, except that the restricting assembly 38 has been replaced with the restricting assembly 138. The restricting assembly 138 includes a first block 150 and a second block 152. The first block 150 is significantly larger than the first block 50 of the first embodiment, whereas the second block 152 is smaller than the second block 52 of the first embodiment. Hence, with the first block 150 and the second block 152 installed to the support member 30, the restricting assembly 138 prevents movement of the first support arm 32 such that the step member remains in or adjacent to the extended orientation.

Third Embodiment

Figure 13:
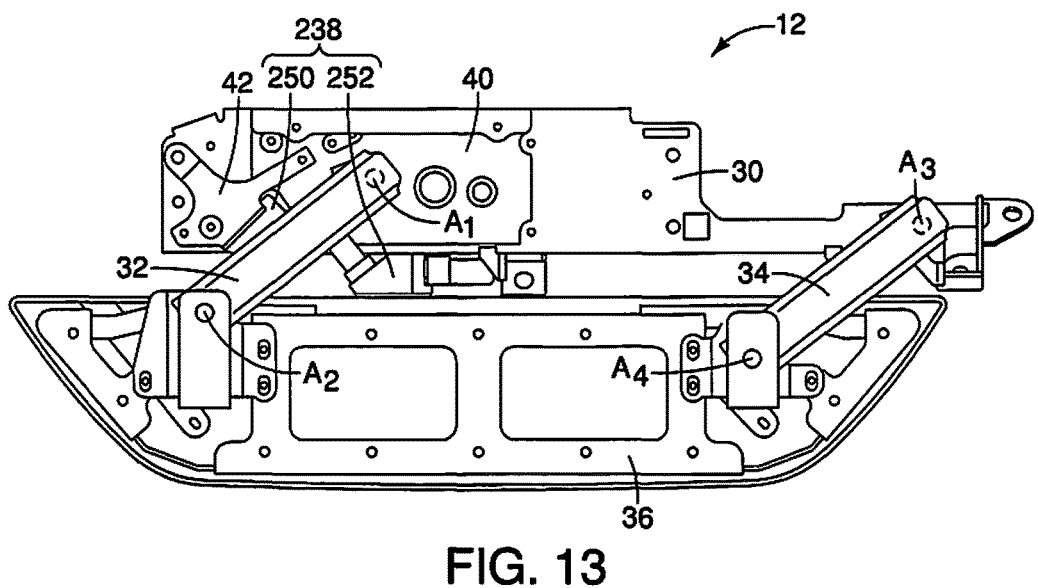
FIG. 13 is a bottom view of the retractable step assembly with a restricting assembly installed to the support member restricting movement of the first support arm such that the step member remains in or adjacent to the retracted orientation in accordance with a third embodiment.

Referring now to FIG. 13, a restricting assembly 238 installed to the retractable step assembly 12 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The retractable step assembly 12 is identical to the retractable step assembly 12 as described above in the first embodiment, except that the restricting assembly 38 has been replaced with the restricting assembly 238. The restricting assembly 238 includes a first block 250 and a second block 252. The first block 250 is significantly smaller than the first block 50 of the first embodiment, whereas the second block 252 is significantly larger than the second block 52 of the first embodiment. Hence, with the first block 250 and the second block 252 installed to the support member 30, the restricting assembly 238 prevents movement of the first support arm 32 such that the step member remains in or adjacent to the retracted orientation.

Fourth Embodiment

Figure 14:
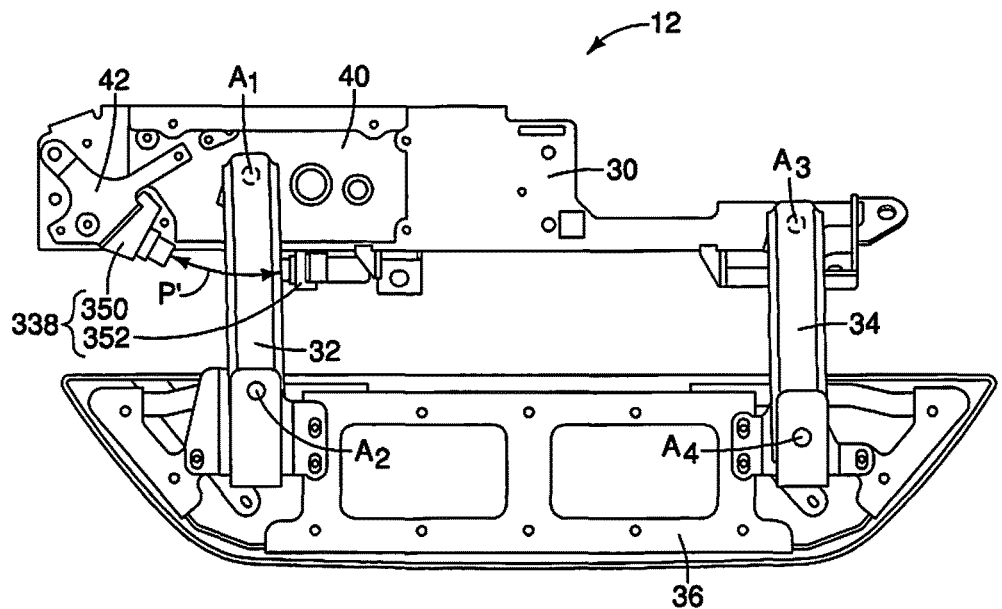
FIG. 14 is a bottom view of the retractable step assembly with a restricting assembly installed to the support member limiting movement of the first support arm such that the step member an overall arcuate path reduced such that the first support arm moves between a first intermediate position spaced apart from the retracted orientation and a second intermediate position spaced apart from the extended orientation and spaced apart from the first intermediate position, showing the first support arm in the second intermediate position in accordance with a fourth embodiment.
Figure 15:
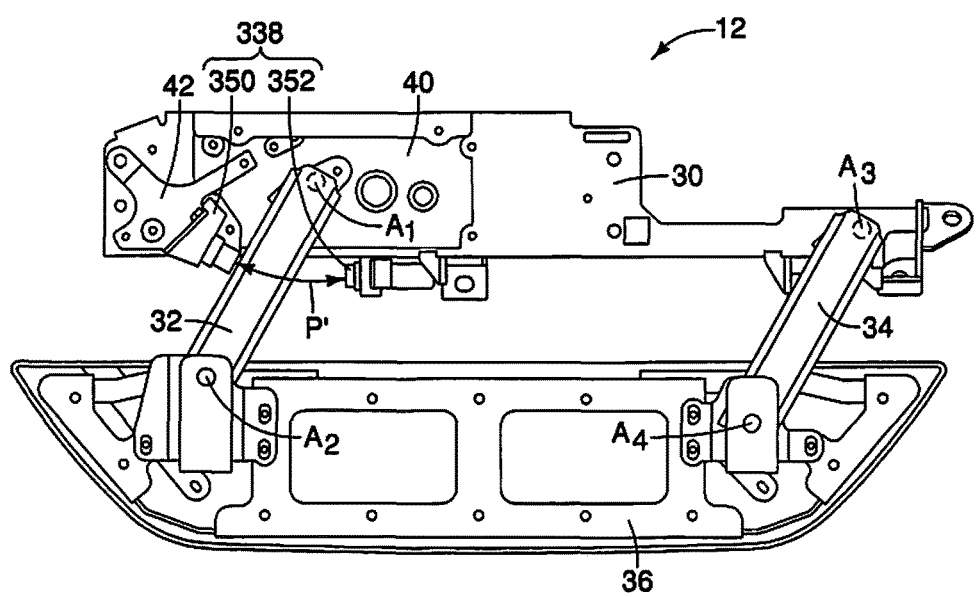
FIG. 15 is another bottom view of the retractable step assembly with the restricting assembly installed to the support member showing the first support arm in the first intermediate position adjacent to the retracted orientation in accordance with the fourth embodiment.

Referring now to FIGS. 14 and 15, a restricting assembly 338 installed to the retractable step assembly 12 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. The parts of the fourth embodiment that differ from the parts of the first embodiment will be indicated with a single prime (').

The retractable step assembly 12 is identical to the retractable step assembly 12 as described above in the first embodiment, except that the restricting assembly 38 has been replaced with the restricting assembly 338. The restricting assembly 338 includes a first block 350 and a second block 352. The first block 350 is approximately the same size as the first block 50 of the first embodiment, whereas the second block 352 is significantly smaller than the second block 52 of the first embodiment. Hence, with the first block 350 and the second block 352 installed to the support member 30, the restricting assembly 338 reduces the overall pivoting movement of the first support arm 32. Specifically, in the absence of the restricting assembly 38 from the retractable step assembly 12, as shown in FIGS. 5 and 6, the first support arm 32 movable along the arcuate path P. In the fourth embodiment, the restricting assembly 338 limits movement to a reduced arcuate path P' that is approximately 30 degrees of motion of the first support arm 32. Hence, the first support arm 32 is limited to movement along the arcuate path P' reduced such that the first support arm 32 moves between a first intermediate position (FIG. 15) spaced apart from the retracted orientation and a second intermediate position (FIG. 14) spaced apart from the extended orientation and spaced apart from the first intermediate position, The vehicle 10 and the retractable step assembly 12 (in the absence of the restricting assemblies 38, 138, 238 and 338) are conventional components that are well known in the art. Since vehicle and retractable step assemblies are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the retractable step assembly. Accordingly, these terms, as utilized to describe the present invention should be interpreted relative to a vehicle equipped with the retractable step assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle retractable step assembly, comprising:
a support member configured to attach to a vehicle body structure;
a support arm having a first end and a second end, the first end being attached to the support member for pivoting movement with respect to the support member;
a step member attached to the second end of the support arm for pivotal movement relative to the second end of the support arm between a retracted orientation where the step member is located adjacent to the support member and an extended orientation where the step member is spaced apart from the support member, the pivotal movement between the retracted orientation and the extended orientation defining an arcuate path and a corresponding angle; and
a restricting assembly releasably attached to the support member such that with the restricting assembly attached to the support member the restricting assembly is positioned to limit pivoting movement of the support arm relative to the support member reducing the size of the arcuate path and the corresponding angle, and with the restricting assembly removed from the support member the support arm can pivot along the arcuate path and the corresponding angle.

2. The vehicle retractable step assembly according to claim 1, wherein
the restricting assembly includes a first block and a vibration dampening member, the first block being attached to the support member and the vibration dampening member being attached to the first block such that the vibration dampening member directly contacts the support arm.

3. The vehicle retractable step assembly according to claim 2, wherein
the vibration dampening member is made of a resilient and compressible material.

4. The vehicle retractable step assembly according to claim 2, wherein
the first block is made of a rigid material that includes a frangible portion such that in response to an impact having a predetermined level of force, the first block breaks along the frangible portion into at least two separate pieces.

5. The vehicle retractable step assembly according to claim 1, wherein
the support member includes a first stop surface and a second stop surface that are positioned to limit movement of the support arm such that with the support arm located adjacent to the first stop surface the step member is in the retracted orientation and with the support arm located adjacent to the second stop surface the step member is in the extended orientation.

6. The vehicle retractable step assembly according to claim 5, wherein
the first stop surface and the second stop surface are positioned with respect to one another such that the support arm defines an arcuate path of between 40 and 80 degrees as measured between the retracted orientation and the extended orientation.

7. A vehicle retractable step assembly comprising:
a support member configured to attach to a vehicle body structure;
a support arm having a first end and a second end, the first end being attached to the support member for pivoting movement with respect to the support member;
a step member attached to the second end of the support arm for pivotal movement relative to the second end of the support arm between a retracted orientation where the step member is located adjacent to the support member and an extended orientation where the step member is spaced apart from the support member;
the support member including a first stop surface and a second stop surface that are positioned to limit movement of the support arm such that with the support arm located adjacent to the first stop surface the step member is in the retracted orientation and with the support arm located adjacent to the second stop surface the step member is in the extended orientation; and
a restricting assembly releasably attached to the support member and positioned to limit pivoting movement of the support arm relative to the support member, the restricting assembly including a first block and a vibration dampening member, the first block being attached to one of the first stop surface and the second stop surface, the vibration dampening member being attached to the first block such that the vibration dampening member directly contacts the support arm.

8. The vehicle retractable step assembly according to claim 7, wherein
the vibration dampening member is made of a resilient and compressible material.

9. The vehicle retractable step assembly according to claim 7, wherein
the first block has a first surface that contacts one of the first stop surface and the second stop surface of the support member and a second surface having the vibration dampening member attached thereto, the first surface being on an opposite side of the first block from the second surface, the first surface being angularly offset from the second surface by an angle that is between 15 degrees and 50 degrees.

10. A vehicle retractable step assembly, comprising:
a support member configured to attach to a vehicle body structure;
a support arm having a first end and a second end, the first end being attached to the support member for pivoting movement with respect to the support member;
a step member attached to the second end of the support arm for pivotal movement relative to the second end of the support arm between a retracted orientation where the step member is located adjacent to the support member and an extended orientation where the step member is spaced apart from the support member;
the support member including a first stop surface and a second stop surface that are positioned to limit movement of the support arm such that with the support arm located adjacent to the first stop surface the step member is in the retracted orientation and with the support arm located adjacent to the second stop surface the step member is in the extended orientation; and
a restricting assembly releasably attached to the support member, the restricting assembly including a first block, a second block, a first vibration dampening member and a second vibration dampening member, the first block being attached to the first stop surface, the second block being attached to the second stop surface, the first vibration dampening member being attached to the first block and the second vibration dampening member being attached to the second block such that the support arm is confined between the first vibration dampening member and the second vibration dampening member.

11. The vehicle retractable step assembly according to claim 10, wherein
the first and second vibration dampening members are made of a resilient and compressible material.

12. The vehicle retractable step assembly according to claim 10, wherein
the first block has a first surface that contacts the first stop surface and a second surface supports the first vibration dampening member, the first surface being angularly offset from the second surface by a first angle,
the second block has a third surface that contacts the second stop surface and a fourth surface supports the second vibration dampening member, the third surface being angularly offset from the fourth surface by a second angle, the sum of the first angle and the second angle being between 30 degrees and 75 degrees.

13. The vehicle retractable step assembly according to claim 10, wherein
at least one of the first block and the second block is made of a rigid material that includes a frangible portion such that in response to an impact having a predetermined level of force, at least one of the first block and the second block breaks along the frangible portion into at least two separate pieces.

* * * * *